United States Patent
Sengupta et al.

(10) Patent No.: US 11,829,918 B2
(45) Date of Patent: Nov. 28, 2023

(54) AUTOMATICALLY LEARNING PROCESS CHARACTERISTICS FOR MODEL OPTIMIZATION

(71) Applicant: Aible Inc., Foster City, CA (US)

(72) Inventors: Arijit Sengupta, San Francisco, CA (US); Jonathan Wray, San Francisco, CA (US)

(73) Assignee: AIBLE INC., Foster City, CA (US)

(*) Notice: Subject to any disclaimer, the term of this patent is extended or adjusted under 35 U.S.C. 154(b) by 135 days.

(21) Appl. No.: 17/194,928

(22) Filed: Mar. 8, 2021

(65) Prior Publication Data

US 2022/0284370 A1    Sep. 8, 2022

(51) Int. Cl.
G06Q 10/06 (2023.01)
G06Q 10/0637 (2023.01)
G06Q 10/0639 (2023.01)
G06N 20/00 (2019.01)

(52) U.S. Cl.
CPC ....... *G06Q 10/06375* (2013.01); *G06N 20/00* (2019.01); *G06Q 10/06393* (2013.01)

(58) Field of Classification Search
CPC .......................................... G06Q 10/00–90/00
See application file for complete search history.

(56) References Cited

U.S. PATENT DOCUMENTS

| | | |
|---|---|---|
| 9,129,226 B2 | 9/2015 | Sengupta et al. |
| 2018/0346151 A1* | 12/2018 | Sturlaugson ........... G06N 20/20 |
| 2019/0253558 A1* | 8/2019 | Haukioja ................ G10L 15/22 |
| 2019/0258983 A1* | 8/2019 | Thomaidou ...... G06Q 10/06398 |
| 2019/0287132 A1* | 9/2019 | Linihan .............. G06Q 30/0205 |
| 2020/0117490 A1* | 4/2020 | Sengupta .............. G06F 3/0482 |
| 2022/0156462 A1* | 5/2022 | McNamara .......... G06Q 30/016 |

* cited by examiner

*Primary Examiner* — Arif Ullah
(74) *Attorney, Agent, or Firm* — Mintz Levin Cohn Ferris Glovsky and Popeo, P.C.

(57) ABSTRACT

Data characterizing inputs to a prediction process that classifies events, an output of the prediction process, and feedback data characterizing a performance of the outcome is monitored. A resource capacity affecting the outcome of the prediction process, and/or a cost-benefit affecting the outcome of the prediction process is determined from the monitoring. The determined resource capacity and/or the determined cost-benefit is provided. Related apparatus, systems, techniques and articles are also described.

28 Claims, 7 Drawing Sheets

AUTOMATICALLY LEARNING PROCESS CHARACTERISTICS FOR MODEL OPTIMIZATION

TECHNICAL FIELD

The subject matter described herein relates to inferring process characteristics such as capacity (e.g., resource constraints), cost-benefit characteristics, and/or the like for model optimization.

BACKGROUND

Artificial intelligence models can be used to aid in decision making such as for deciding whether to replace a part of a machine, whether to classify an email as spam, and many other applications. In many approaches, an artificial intelligence model is trained on data that has been manually labeled. The model is trained with the data, which includes an input, an output, and the label (e.g., whether the output is correct). During deployment (e.g., use) of the model, new input data is received, and the model provides an output, which in some instances can be considered a predication and/or a classification of the input data. But in many instances, the model is trained purely for accuracy (e.g., to make a correct prediction), and does not take into account other factors that may be relevant, such as the cost-benefit of taking action on the prediction, as well as the capacity to take action on the prediction (e.g., if there are limited resources, constraints, and the like).

SUMMARY

In an aspect, data characterizing inputs to a prediction process that classifies events, an output of the prediction process, and feedback data characterizing a performance of the outcome is monitored. A resource capacity affecting the outcome of the prediction process, and/or a cost-benefit affecting the outcome of the prediction process is determined from the monitoring. The determined resource capacity and/or the determined cost-benefit is provided.

One or more of the following features can be included in any feasible combination. For example, determining the resource capacity can include determining a number of outputs assigned to a first class of at least two classes over a period of time. The resource capacity can characterize a number of events that an entity has resources to process over the period of time. Determining the cost-benefit affecting the outcome of the prediction process can include estimating a cost of a false positive, a cost of a false negative, a benefit of a true positive, and a benefit of a true negative. The inputs to the prediction process can include information associated with sales leads, the events including sales opportunities, and the feedback data characterizes whether pursuing the sales leads resulted in conversion of the sales leads. The feedback data can characterize whether the output of the prediction process was accurate.

That a sufficient amount of data characterizing the inputs, the output, and the feedback data has been received can be determined based on the monitoring. A model can be trained to perform the prediction process using the monitored data. The trained model can be deployed within an enterprise resource management system for operating on new input data to the prediction process. New data characterizing input data for a new event can be received. A first class of at least two classes for the new event can be determined using the model, the capacity, and/or the cost-benefit. An impact value of the first class of the new event can be determined. The first class and the determined impact value can be provided. Training the model can include training a set of models, each model in the set of models trained for at least one resource capacity value. Determining the first class using the model can include selecting the model from the set of models according to the determined resource capacity.

In another aspect, user activity related to compliance with a predictive model that classifies an event as belonging to a first class of at least two classes can be monitored. The monitoring includes receiving, for each of a plurality of events classified by the predictive model, whether a user took action associated with the first class, a capacity of the user, and a cost-benefit associated with the first class. An updated capacity and/or an updated cost-benefit is determined based on the received data. The updated capacity and/or the updated cost-benefit is provided.

One or more of the following features can be included in any feasible combination. For example, the monitoring can include receiving user input characterizing the capacity and/or the cost-benefit. The determining the updated capacity and/or the updated cost-benefit can include increasing or decreasing the capacity and/or the cost-benefit. The monitoring can include monitoring a field within a dataset for modification that indicates specific action by the user. The determining the updated capacity and/or updated cost-benefit can include determining that the user treats more events as belonging to the first class than the predictive model classifies into the first class. The updated capacity can be determined to be greater than the capacity. The updated cost-benefit can be determined to include a greater benefit of true positive and/or a lower cost of false positive. The determining the updated capacity and/or updated cost-benefit can include determining that the user treats fewer events as belonging to the first class than the predictive model classifies into the first class. The updated capacity can be determined to be less than the capacity. The updated cost-benefit can be determined to include a greater cost of false positive and/or a lower benefit of true positive.

That the user treats events classified into a second class by the predictive model as belonging to the first class can be determined. A performance of the predictive model can be determined. A performance of the user can be determined. A new model can be determined in response to the performance of the user exceeding the performance of the model. Data characterizing performance of a plurality of models associated with a plurality of users can be received. Each of the plurality of models can be associated with a respective user from the plurality of users. Data characterizing, for each of the plurality of users, a respective compliance of the respective user can be received. A differential pattern of performance and compliance across the plurality of models and the plurality of users can be determined. A desegregated model performance and a desegregated user compliance can be determined based on the differential pattern of performance and compliance. The predictive model can form part of a set of models trained according to respective capacity levels.

A new model from a set of models can be selected in response to determining the updated capacity and according to the updated capacity. The event can include a sales opportunity and the first class indicates that the sales opportunity should be pursued. The capacity can characterize a number of events the user processes within a given period of time. The cost-benefit can characterize an impact of treating the event as belonging to the first class, the impact characterized by a cost of a false positive, a cost of a false negative, a benefit of a true positive, and a benefit of a true negative.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

In many predictive systems, a model is trained purely for accuracy (e.g., to make a correct prediction), and does not take into account other factors that may be relevant, such as the cost-benefit of taking action on the prediction, as well as the capacity to take action on the prediction (e.g., if there are limited resources, constraints, and the like). Accordingly, some predictive platforms or systems can make recommendations (e.g., decisions, predictions, classifications, and the like) based on not only using a trained model (e.g., artificial intelligence (AI) model, predictive model, prescriptive models, and the like), but can take into consideration the capacity (e.g., resource constraints, resource level, and the like) for acting upon (e.g., handling, processing, and the like) the prediction, as well as the cost-benefit (sometimes referred to as the cost-benefit ratio, cost-benefit tradeoff, or impact) of following the prediction.

In some systems, a capacity can be specified (e.g., by a user) and a model can be trained to be optimal for that specified capacity. This allows, for example, for a model to return not only predictions that are likely to be accurate, but the predictions that are most likely to be accurate given the ability or limits on resources for acting on the prediction. Considering an example where the decision is whether or not to pursue a sales lead. There may be practical resource limitations to how many sales leads can be pursued in a given period of time. For example, if 20 sales leads are likely convertible, but the sales team can only pursue 15 leads, then the capacity is 15 leads, and the model can be trained and chosen to select the 15 best leads (e.g., that are most likely to convert if pursued). A model that focuses on finding the best 15 leads is likely to do better at that specialized job than a general model that tries to detect good leads in general.

In addition, for a given event to-be-processed, the model can provide its output (such as a classification, prediction, and the like), and a cost-benefit value can be calculated. An example cost-benefit can include an impact value, which can be the expected value of taking action on the prediction. The expected value can be, for example, the sum of the cost or benefit of the output being a false positive times its probability of occurring, a false negative times its probability of occurring, a true positive times its probability of occurring, and a true negative times its probability of occurring. The cost-benefit value can provide the user with insight into the practical impact of following the output (e.g., decision) in terms such as expected profit, expected growth, and the like. Such an impact function can be useful, for example, where the cost of following the prediction can be high. Considering the sales team example mentioned above, if pursuing each lead requires spending $10,000, not pursing a lead requires $0, but each converted lead results in $50,000 of revenue, then the cost-benefit value can be the expected value of pursuing the lead. For example, the cost-benefit value can be determined as the impact function (described above) where the cost of false positive is $10,000, the cost of false negative is $0, the benefit of true positive is $40,000 (which is determined as the benefit of converting ($50,000) minus the cost of pursuing ($10,000)), and the benefit of a true negative is $0. In some implementations, the impact function can be more complex, for example, the weights can be different if soft costs and benefits are considered as well.

By considering more than just the output of a model trained to accurately predict the true nature or characteristic of an event, these systems can provide added value and insight for users, for example, within an enterprise resource management system.

However, when initially training such systems, it can be challenging to accurately estimate the appropriate values for capacity and cost-benefit. A user can input an estimate of the capacity and cost-benefit, but this may not be accurate. When the capacity and cost-benefit estimates are incorrect, it can lead to suboptimal or poor outputs from the predictive system, resulting in decreased compliance of users with the predictions as well as poorer performance.

Accordingly, some implementations of the current subject matter can include monitoring user behavior and activity for an existing predictive (e.g., decision, recommendation, classification, and the like) process. The monitoring can include identifying and/or receiving the inputs to the process, an output of the process (e.g., a prediction), whether the user performed an action based on the prediction, and feedback regarding performance of the output (e.g., an accuracy of the prediction). Using the monitored data, a capacity and/or cost-benefit of the prediction can be estimated. For example, information associated with a sales lead (e.g., the input data), whether a sales associate decides to pursue each lead (e.g., prediction that sales lead will convert), and whether the sales lead was successfully converted (e.g., feedback on accuracy of the prediction) can be monitored, for example, by monitoring one or more data sources (e.g., databases) within an enterprise management system. Capacity can be estimated, for example, by determining an amount of leads pursued over a period of time. The cost-benefit can be estimated, for example, by observing how aggressive (e.g., high rate of failed pursuits) or conservative (e.g., high success rate for those pursued) and this can be used to estimate relative costs or benefits of false positives, false negatives, true positives, and true negatives. In some implementations, absolute costs and benefits can be estimated via observation, for example, by observing the deal size of sales opportunities pursued. By estimating capacity and/or cost-benefit values from user behavior, more accurate capacity and/or cost-benefit values can be utilized in the decision systems, thereby improving system performance. Human feedback can also be biased, such as a sales supervisor underestimating the cost of failed sales pursuits. By observing the actual actions of people and learning from their behavior as opposed to their answers to questions, such sources of human bias can be avoided. Improving system performance can improve outcomes according to business metrics (e.g., profit as opposed to a number of leads successfully converted).

In some implementations, human bias can be identified. For example, implied costs for deal size ranges can be estimated and how the implied costs change can be shown. For example, small deals are often ignored which can identify a psychological or procedural bias that implies small deals are actually more costly to work than they would be in actuality. Similarly, large deals often receive too much focus which would imply their costs are lower than expected. An inverted implied cost to deal size relationship can be an indication of a behavioral bias favoring large deals. For example, a small deal can have an actual cost of $2,000, and an implied cost of $5,000; a medium deal can have an actual cost of $4,000, and an implied cost of $4,000; and a large deal can have an actual cost of $5,000 but an implied cost of $3,500. By identifying deviations between actual costs and implied (e.g., estimated from user behavior), behavioral bias can be reduced.

Once a model is deployed with a capacity and cost-benefit, the estimates (whether determined using the above-described approach, manually entered by a user (e.g., estimated by the user), or using another approach) may not be completely accurate. This can result in non-compliance with system recommendations by a user because a user may have more information than the system and therefore is able to make better predictions than the system. Such underperformance by the system can lead to non-compliance by users, reducing the value of an automated decision or recommendation system.

Accordingly, some implementations of the current subject matter can include monitoring user behavior, such as compliance with the system predictions, and using the user behavior to update and improve the estimates of capacity and/or cost-benefit. For example, using the sales example described above, if the system recommends pursing 20 sales leads (e.g., predicts those 20 sales leads are likely to convert if pursued) and the user only pursues 15 of the 20 recommendations, then a capacity may need to be updated to reduce the estimated capacity. Other inferences can be drawn from user behavior with respect to the system, as described more fully below. By updating capacity and/or cost-benefit estimates based on user behavior, some implementations of the current subject matter can improve the usefulness and performance of prediction systems, improve compliance, and improve enterprise-wide performance of the enterprise as measured by business metrics (e.g., profits, revenue, growth, and the like).

Figure 1:
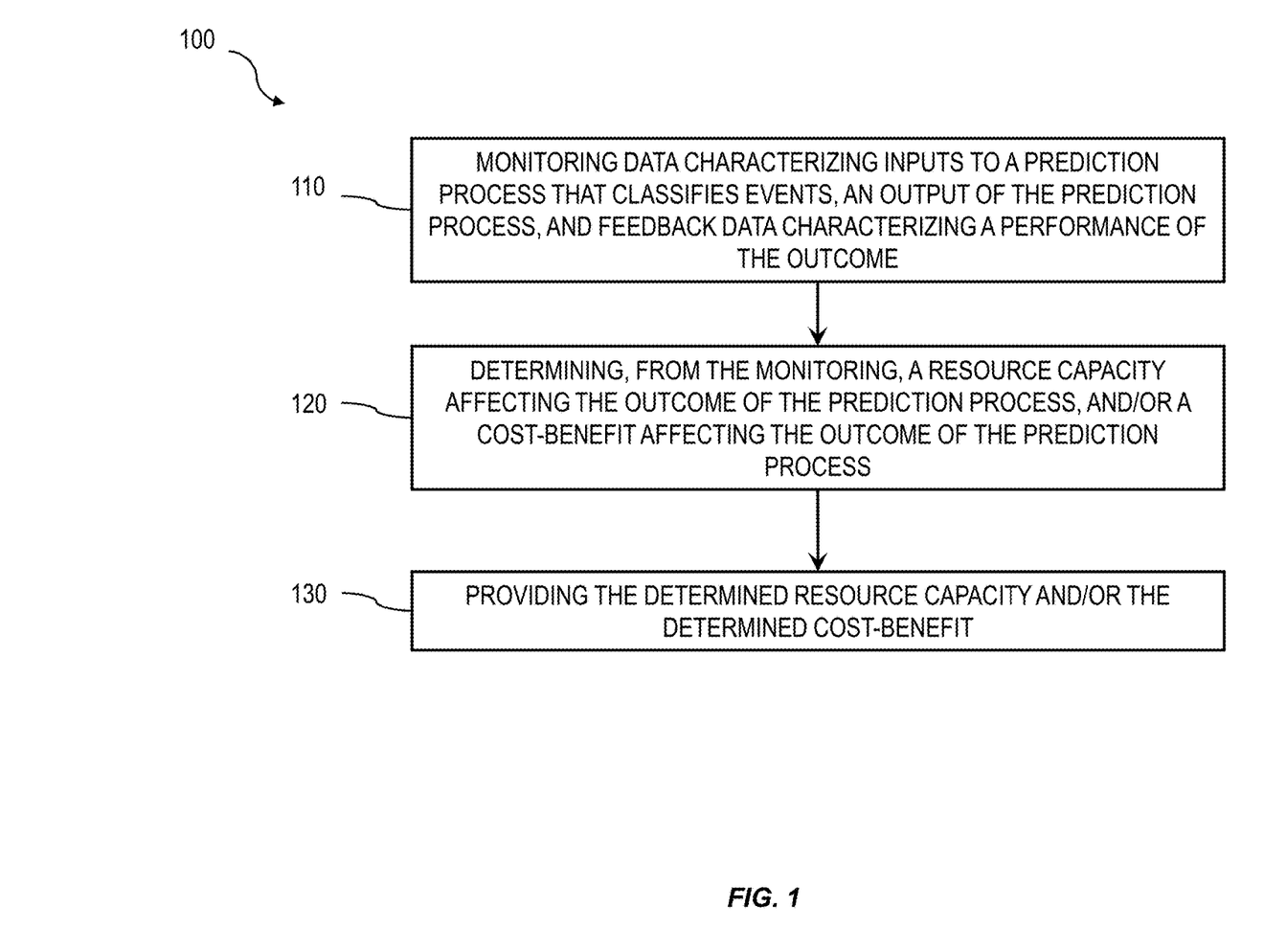
FIG. 1 is a process flow diagram of an example process of estimating a capacity and/or cost-benefit associated with a prediction process.

FIG. 1 is a process flow diagram of an example process 100 of estimating a capacity and/or cost-benefit (e.g., of a user, team of users, entity, organization, and the like) associated with a prediction process.

At 110, data characterizing inputs to a prediction process that classifies events, an output of the prediction process, and feedback data characterizing a performance of the outcome can be received. The prediction process can be an existing prediction process utilized in an enterprise resource management system and can be, for example, driven by human decision making or prediction. For example, the existing prediction process can be one that outputs a prediction, using sales information (e.g., input data), whether or not a sales lead is convertible if pursued (e.g., the output).

The feedback data can characterize whether the prediction was accurate (e.g., a true positive or false positive). For example, if the prediction was to pursue a given lead, and the lead is pursued and converted, then the feedback can indicate that the prediction was a true positive. Indications that the prediction was a true positive, true negative, false positive, and false negative is possible in some implementations.

At 120, a resource capacity affecting the outcome of the prediction process and/or a cost-benefit affecting the outcome of the prediction process is determined from the monitoring. The resource capacity can characterize a number of events that an entity has resources to process over the period of time. For example, if a sales team can process 20 leads a month, then the resource capacity can be 20 leads per month.

Determining the resource capacity can include determining a number of outputs assigned to a first class of at least two classes over a period of time. The number of outputs assigned to the first class can be determined, for example, based on observing how many transactions users pursue or don't pursue. For example, the first class can be to pursue a sales lead (the two classes can be "pursue" or "don't pursue", for example). In some implementations, this capacity estimate can be measured for each individual user because different users are likely to have different ability to pursue transactions. Clustering analysis may be conducted to determine whether certain types of transactions require higher level of effort and the capacity constraints adjusted to consider a tradeoff between fewer more-complex transactions versus more less-complex transactions. Balancing approaches described in U.S. application Ser. No. 16/290,446 filed Mar. 1, 2019, and published as US2020/0117765A1, the entire contents of which is hereby expressly incorporated by reference herein, can also be used to determine an optimal (or improved) allocation of resources between higher effort transactions and lower effort transactions based on their relative cost-benefit tradeoffs as well as relative effort tradeoff.

In some implementations, resource capacity, cost-benefit ratio, and the like can be determined at an individual level, rather than a group or organizational level. Such an approach can allow for the system to tailor decisions to the individual and therefore account for variations in working styles, cost-benefit values that may vary by activity (for example, an individual may be biased towards selling a particular product, may be better at promoting a certain product or better able to close a deal with a certain type of customer, and the like). In some implementations, a profile can be associated with each individual specifying that individual's cost-benefit for one or more activities.

In some implementations, determining the cost-benefit affecting the outcome of the prediction process can include estimating a cost of a false positive, a cost of a false negative, a benefit of a true positive, and a benefit of a true negative. For example, if a process exhibits very few failed pursuits, this means the False Positive rate is low and thus the cost of False Positive is likely to be high. Alternatively, if the process exhibits a large number of false positives even while only a subset of transactions are being worked on (e.g., pursued), it can be inferred that the relative cost of false positive is low compared to the benefit of a true positive. A case where almost all transactions are being pursued, for example a SPAM mail case, may imply the cost of False Positive is close to zero or minimal compared to the cost of False Negative or benefit of True Positive.

At 130, the determined resource capacity and/or the determined relative or absolute cost-benefit can be provided. The providing can include, for example, storing, transmitting, displaying or further processing.

In some implementations, the determined resource capacity and/or cost-benefit can be provided for establishing an automated predictive system that can replace the existing predictive process. For example, in some implementations, it can be determined, based on the monitoring, that a sufficient amount of data characterizing the inputs, the output, and the feedback data has been received, and a model can be trained to perform the prediction process using the monitored data. In such implementations, the trained model can be deployed within an enterprise resource management system for operating on new input data to the prediction process.

For example, new data characterizing input data for a new event can be received. A first class of at least two classes for the new event can be determined using the trained model, the determined resource capacity, and/or the determined cost-benefit. An impact value of the first class of the new event can be determined. The first class and the determined impact value can be provided to the user. The user can, for example, take action on the prediction, such as to pursue a sales lead.

In some implementations, training the model includes training a set of models, where each model in the set of models can be trained for at least one resource capacity value. Such an approach can utilize an efficient frontier model, as described more fully below. Determining the first class using the model can include selecting the model from the set of models according to the determined resource capacity.

Figure 2A:
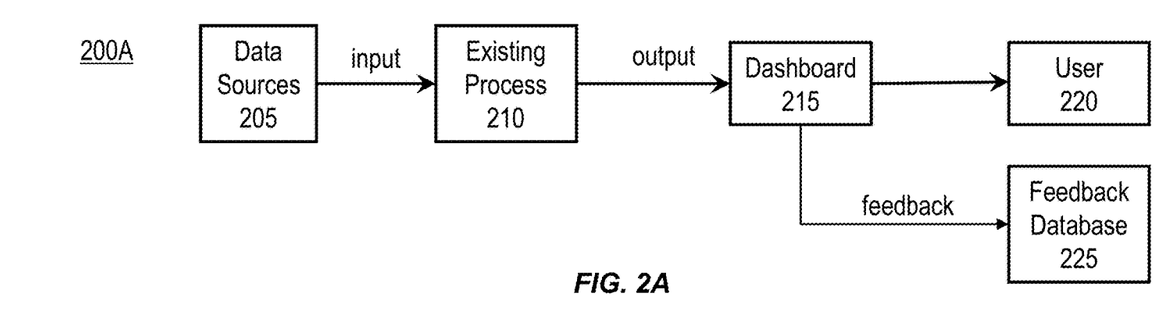
FIG. 2A is a system block diagram illustrating an example enterprise resource management system that includes a predictive process.

FIG. 2A is a system block diagram illustrating an example enterprise resource management system 200A that includes a predictive process. Data sources 205 can provide input data associated with a process. For example, sales lead information can be obtained from data sources that can include database, third party data sources, and the like. The data sources 205 can be enterprise databases or can include API's to third party data sources. The input data is provided to existing process 210, which produces an output that can be displayed in a dashboard 215 for use by a user 220. In some implementations, the existing process 210 can be performed by the user 220. For example, the user 220 can decide, using the input data, whether to pursue a lead. The user 220 can provide feedback regarding whether or not the output was accurate (e.g., correct) via the dashboard 215, and that feedback can be stored in a database 225.

Figure 2B:
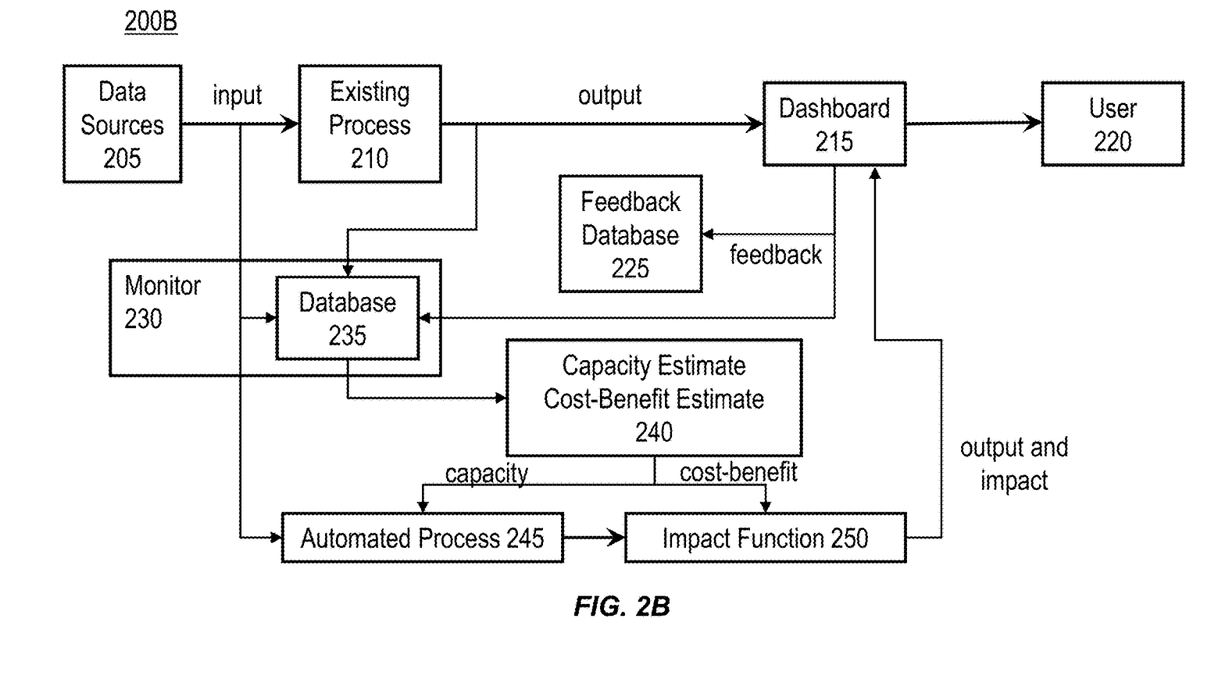
FIG. 2B illustrates another example enterprise resource management system according to some implementations.

FIG. 2B illustrates another example enterprise resource management system 200B that can estimate capacity and/or cost-benefit of the existing process 210 and can further utilize the capacity estimate and/or cost-benefit estimate for performing an automated process to replace the existing process 210 using, for example, artificial intelligence models.

The system 200B can further include a monitor service 230 that includes a database 235. The monitor service 230 can monitor the datastream of the existing process 210 including obtaining the inputs from the datasource 205, output from the existing process 210, and feedback stored in the feedback database 225.

The system 220B can further include a capacity estimate and/or cost-benefit estimate service 240 that can estimate the capacity and/or cost benefit, as described above, for example, with reference to FIG. 1.

In addition, system 200B can include an automated process service 245 that can include one or more predictive models trained using data obtained by the monitor service 230. The system 200B can also include an impact function calculation service 250. Once a model is trained and the capacity and cost-benefit are estimated, the automated process 245 can obtain new input data from datasources 205 and output a prediction using the trained model. In some implementations, the model can form part of an efficient frontier, and the model can be selected from the efficient frontier using the estimated capacity. The output from the automated process 245 can be received by the impact function service 250, which can compute an impact value using, for example, the estimate cost-benefit. The output along with the impact value can be provided to dashboard 215 for the user 220 to take action.

Figure 3:
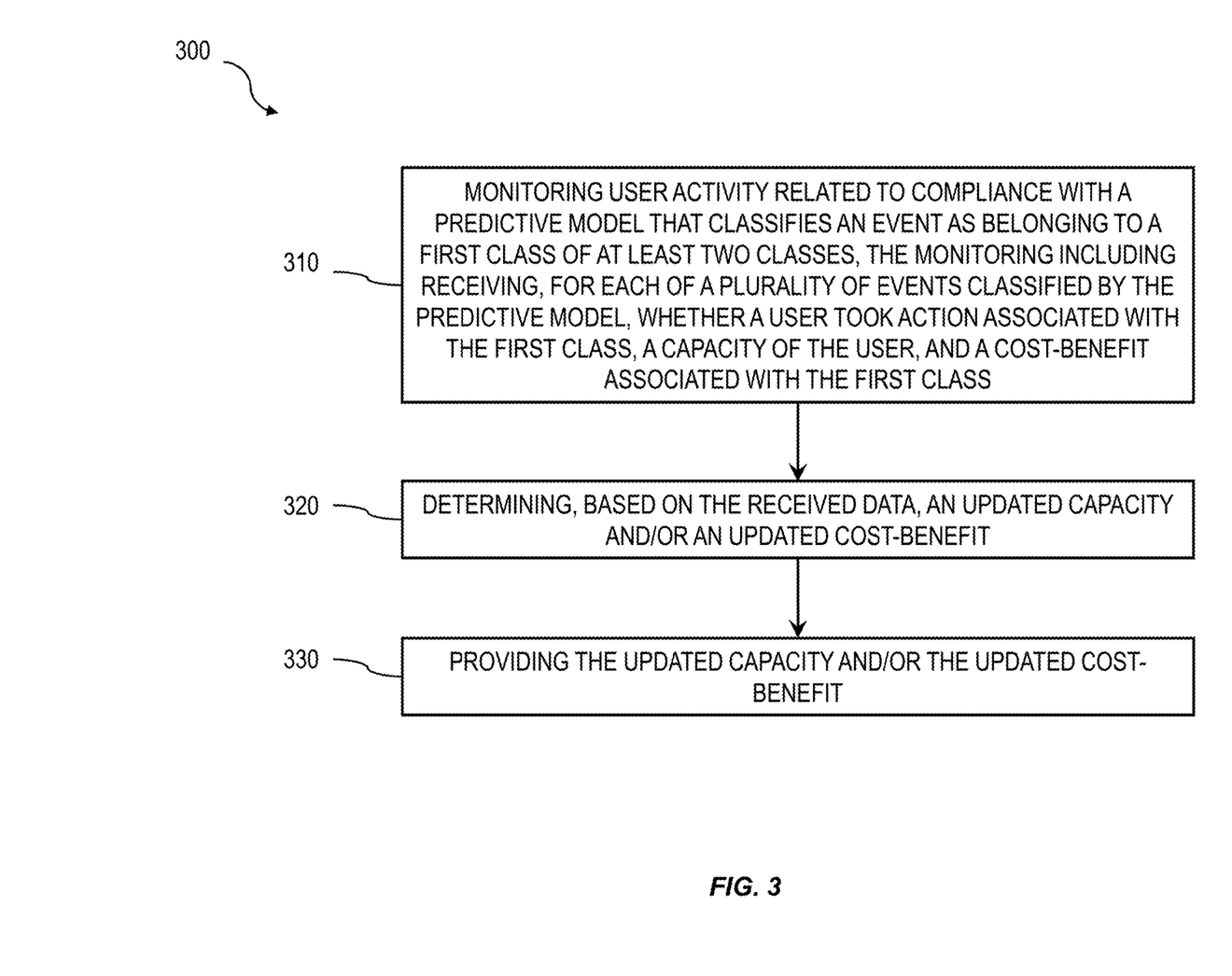
FIG. 3 is a process flow diagram illustrating an example process that can update and improve the estimated capacity and/or cost-benefit based on monitoring user behavior.

FIG. 3 is a process flow diagram illustrating an example process 300 that can update and improve the estimated capacity and/or cost-benefit based on monitoring user behavior.

At 310, user activity related to compliance with a predictive model that classifies an event as belonging to a first class of at least two classes can be monitored. The monitoring can include receiving, for each of a plurality of events classified by the predictive model, whether a user took action associated with the first class, a capacity of the user, and a cost-benefit associated with the first class.

In some implementations, the user activity can be expressly provided by the user intending to modify the capacity and/or cost-benefit. For example, the monitoring can include receiving user input characterizing the capacity and/or the cost-benefit. For example, the user can be presented with and interact with a slider bar, a thumbs up or down icon, and the like, within a graphical user interface. The determining the updated capacity and/or the updated cost-benefit can include increasing or decreasing the capacity and/or the cost-benefit based on the user input. Such implementations can allow for a user to provide explicit feedback regarding whether they view a predictive system as being too conservative or too aggressive, and for updating of capacity and/or cost-benefit accordingly. In some implementations, the user activity can provide feedback related to predictive variable (e.g., drivers) to help indicate which variables are more probative of the correct classification.

In some implementations, the user activity indicating that the user views the predictive system as being too conservative or too aggressive can be inferred from other actions taken by the user. For example, the monitoring can include monitoring a set of fields within a dataset for modification that indicates specific action by the user. For example, a database can be monitored that includes a field indicating whether or not a user has acted upon the prediction. In another embodiment, a customer relationship management (CRM) system may collect information on sales calls placed or emails sent, and the occurrence of or the frequency of such activities indicate that the user has acted upon the predictions. For example, whether a sales team member has pursued a sales lead (e.g., when the event includes a sales opportunity and the first class indicates that the sales opportunity should be pursued). This allows for user compliance with the prediction to be determined.

As noted above, capacity can characterize a number of events the user processes within a given period of time. The cost-benefit can characterize an impact of treating the event as belonging to the first class, the impact can be characterized by a cost of a false positive, a cost of a false negative, a benefit of a true positive, and a benefit of a true negative.

At 320, an updated capacity and/or an updated cost-benefit can be determined based on the received data. Depending on the actions of the user, several inferences about cost-benefit and capacity can be drawn.

For example, in some implementations, determining the updated capacity and/or updated cost-benefit can include determining that the user treats more events as belonging to the first class than the predictive model classifies into the first class. For example, if the system classifies 20 events into the first class (e.g., pursue lead) but the user treats 25 events as belonging to the first class (e.g., the user pursues 25 leads instead of the recommended 20). In this case, the updated capacity can be determined to be greater than the capacity. In some implementations, the capacity can be incremented by a preset amount. Similarly, the updated cost-benefit can be determined to include a greater benefit of true positive and/or a lower cost of false positive. In some implementations, the benefit of true positive can be incremented and the cost of false positive can be decremented.

In some implementations, determining the updated capacity and/or updated cost-benefit value can include determining that the user treats fewer events as belonging to the first class than the predictive model classifies into the first class. For example, the system may classify 20 events as belonging to the first class, but the user only treats 15 of the events as belonging to the first class (e.g., the user pursues 15 leads instead of the recommended 20 leads). In this instance, the updated capacity can be determined to be less than the capacity. The updated cost-benefit value can be determined to include a greater cost of false positive and/or a lower benefit of true positive.

In some implementations, it can be determined that the user treated events differently than how the system classified those events. For example, where the system classifies 20 events into a first class, and the user classifies only 2 of those 20 events into the first class but also classifies 18 other events, which the system classified into the second class, as belonging to the first class, then further assessment of the model and user performance can be performed. For example, the performance of the model can be determined and the performance of the user can be determined. If the user is more accurate than the model (e.g., the classifications by the user were more accurate), then a new model can be determined. If the model is more accurate than the user, than education of the user (e.g., instruction) can be provided to ensure compliance with the model. In some implementations, the user can be aware of the classification by the system and can choose to accept the predictions or not, thus implying their classification differs from the system's classification.

In the example where the user outperforms the model, then several different actions may be taken. In one implementation, clustering analysis may be conducted to determine whether there is an underlying pattern to where the user differed from the system. For example, if the user mainly differs for transactions related to a specific product, then they may know something special about that product that causes the user to disagree with the model. In such a case, a specialized or a set of specialized models may be created for such subgroups and the new specialized models outputs can be compared to the user's determination. If the specialized models perform better than the original models, then they may be set up such that specialized models are used for the identified sub groups and the non-specialized model for other transactions. In some implementations, the system may also retrain a new model for the rest of the data excluding the clusters identified via this analysis and use that instead for the non-specialized model. In some implementations, the system may interpret the user's actions to infer the system recommendations (e.g., classifications) are not aggressive or conservative enough and an appropriate new model with appropriate cost-benefit tradeoffs or capacity constraints can be chosen or retrained and compared to the decisions of the user. If the new model performs better than the old model and/or conforms more closely to the user's decisions, the new model may replace the old model. In some implementations, the user may be prompted for feedback on why they differed from the system in the case of specific transactions. That user feedback can be used to improve the model.

At 330, the updated capacity and/or the updated cost-benefit can be provided. The providing can include transmitting, displaying, storing, and further processing. In some implementations, the updated capacity and/or updated cost-benefit can be utilized for further predictions on new events.

As noted above, in some implementations, efficient frontier models can be utilized. In these implementations, the predictive model can form part of a set of models trained according to respective capacity levels and/or cost-benefit tradeoffs. The updated capacity and/or cost-benefit tradeoff can cause the predictive system to select, in response to determining the updated capacity and/or cost-benefit tradeoff, a new model from the set of models according to the updated capacity and/or cost-benefit tradeoff. In other words, with the updated capacity and/or cost-benefit tradeoff, a different model from the efficient frontier can be selected.

Figure 4:
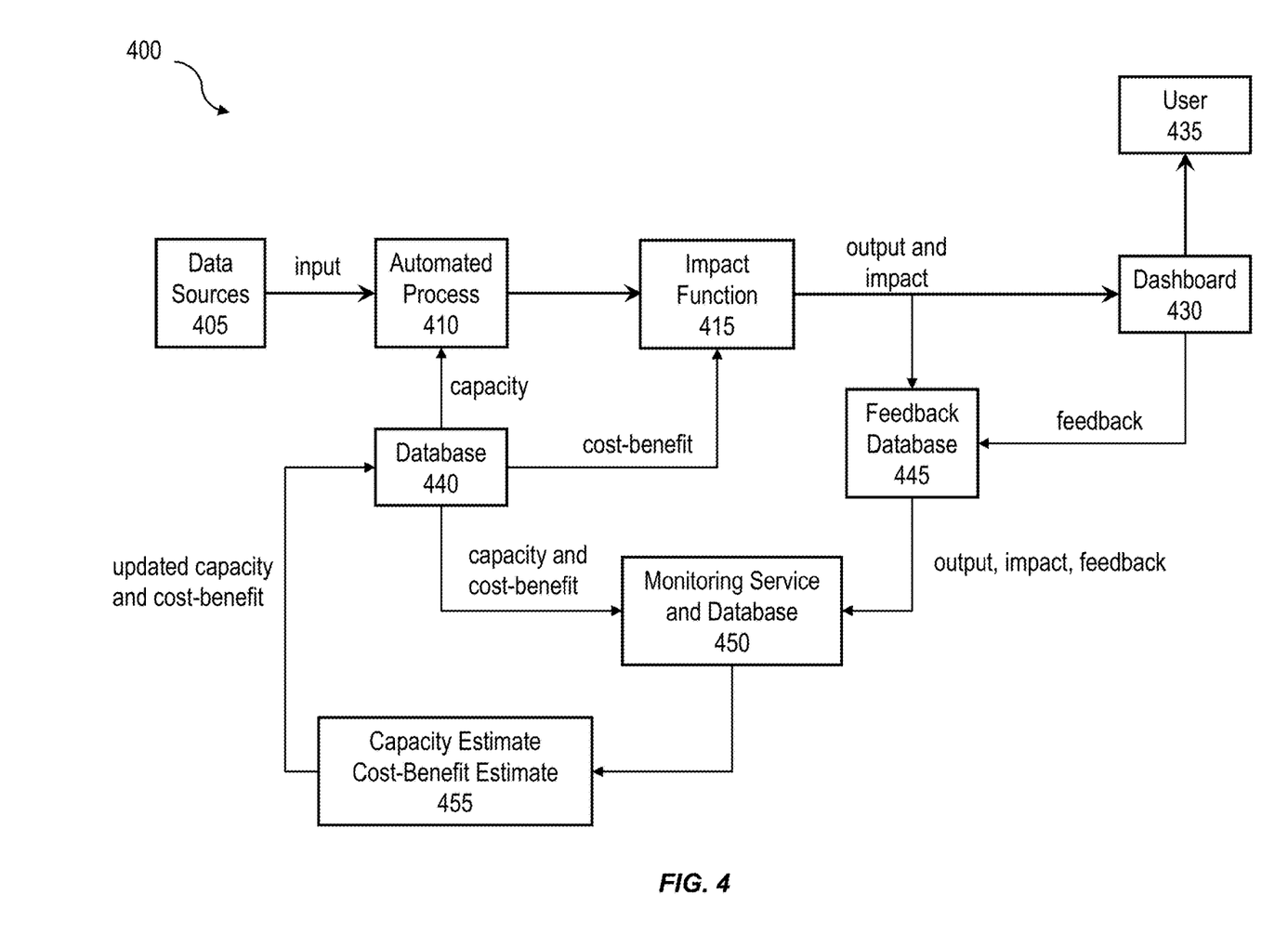
FIG. 4 is a system block diagram illustrating an example predictive system that can update capacity and/or cost-benefit values by observing user behavior.

FIG. 4 is a system block diagram illustrating an example predictive system 400 that can update capacity and/or cost-benefit values by observing user behavior. The system receives input data associated with events from one or more data sources 405. The input data can be processed by an automated process 410 that can include a predictive model. The automated process 410 can utilize the capacity estimate as part of the prediction process to produce an output (e.g., prediction, classification, and the like) of the event. The output can be provided to an impact function service 425 that can, utilizing the cost-benefit, determine an impact value. The output and impact can be provided to a dashboard 430 for viewing by user 435 and action by the user 435. The capacity and cost-benefit can be stored in and received from a database 440. The user 435 can provide feedback via dashboard 430, which is stored in feedback database 445. The feedback can include the class that the user assigned to the event, as well as the ultimate outcome (e.g., whether the prediction was accurate or not).

The system 400 can further include a monitoring database 450 that can obtain the capacity, cost-benefit, output, impact, and feedback for events from the database 440 and the feedback database 445. A capacity estimate and cost-benefit estimate service 455 can obtain the capacity, cost-benefit, output, impact, and feedback for events and estimate an updated capacity and/or updated cost-benefit estimate, for example, as described above with respect to FIG. 3. The updated capacity and/or updated cost-benefit can be provided back to database 440 for use by the automated process 410 in processing additional new events.

Although a few variations have been described in detail above, other modifications or additions are possible. For example, different users can set different cost-benefit or capacity preferences and thus end up with different optimal models. An analysis of each model's performance and corresponding user compliance, and the differential patterns of performance and compliance across users can be used to figure out how to statistically desegregate the model performance and user compliance effects to improve models based on these insights. For example, different users have different preferences and different compliance patterns can create sufficient differential observations of these patterns to enable desegregation of effects via principal component analysis, for example.

In some implementations, a behavior model can be utilized which can allow for indications or determinations of causality within a dataset. For example, given a dataset and associated labels, a behavioral model can be utilized to determine features of the dataset, such as the order fields where included or entered into the dataset. In some implementations, the inputs, outputs, and feedback to a prediction process can be monitored. Features of the inputs that characterize patterns indicative of causality can be determined using a behavioral model. At least one model can be trained based on the inputs, outputs, feedback, and determined features. The behavior model can include a characterization or model of steps a user performs as part of the process. The features can characterize the order that fields of the dataset (e.g., inputs and/or feedback) are filled in.

The subject matter described herein provides many technical advantages. For example, in traditional model monitoring, the accuracy of a model is determined. But, whether or not a user complied with the recommendations of the model can have a significant impact on the observed accuracy of the model. For example, if the model predicted a customer would buy, but the salesperson ignored the recommendation, and then the customer did not buy is different from a similar case where the salesperson aggressively pursued the customer and they still did not buy. Some implementations of the current subject matter can effectively desegregate model performance from user compliance, enables monitoring of both (model performance and user compliance) separately, and can learn different insights from each of these cases to both improve model performance and induce better model compliance by users.

Training Sets of Models Based on Varying Capacity

Some implementations of the current subject matter can train and assess multiple models with multiple different constraints on the input parameters. And the multiple models can be treated as a single model (also referred to as an efficient frontier). For example, each model can be trained with each of the different constraints on a given input parameter and the performance of each model can be assessed under each of the different constraints. The assessment of the performance of the models can be provided in a visualization illustrating a feasible performance region of the models. For example, the feasible performance region can include a boundary representing, for the set of models trained under the different constraints, predictions as a function of the given constrained parameter and an indication of the model that produced a given prediction. Given a constraint, such as a capacity or resource level, the model most appropriate for the given constraint can be selected and deployed to perform predictions under the given constraint.

As used herein, a constraint is also sometimes referred to as a capacity or resource level but other types of constraints such as cost-benefit tradeoffs may also be used.

Accordingly, some implementations of the current subject matter can provide improved predictions by training and assessing multiple models under different constraints and providing an intuitive representation of the models and their performance under the different constraints. By training and assessing multiple models under different constraints and providing an intuitive representation of the performance of the models under the different constraints, the model most appropriate for a given operational constraint can be selected and deployed.

In some implementations, a set of models, $M=\{M_1, \ldots, M_k\}$ (where $M_i \in M$ is a model) can be trained using a set of resourcing levels (e.g., constraints and/or the like), $C=\{c_1, \ldots, c_p\}$ (where $c_i \in C$ is a constraint) can be received. In some cases, the set of models can be represented as an ensemble model. An ensemble model can be allow for interaction with the set of models by interacting with the ensemble model. For example, providing an input data entry $x^{(j)}$ from a dataset $D_n=\{x^{(1)}, \ldots, x^{(n)}\}$ where n is the number of variables (e.g., columns and/or the like) associated with respective entries in the dataset and j=1, n, to an ensemble model M including a set of models $\{M_1, \ldots, M_k\}$ can be the equivalent of providing the data entry as input to each model in the set of models (e.g., $M(x^{(j)})=\{M_1(x^{(j)}), \ldots, M_k(x^{(j)})\}$). The set of constraints can specify a condition on a variable of the models. Each model (e.g., submodel and/or the like) in the set of models (e.g., ensemble model) can be trained using at least one constraint in the set of constraints. For example, the specified condition on the variable of the model can limit the space of possible solutions provided by the set of models. For example, for a given input $x^{(j)}=(x_1^{(j)}, \ldots, x_d^{(j)})$, where $x^{(j)} \in R^d$ is a d-dimensional vector, each model can provide an output, such as a classification, $M_i(x^{(j)})=y_i^{(j)}$ (where $y_i^{(j)} \in \{\text{positive}, \text{negative}\}$ corresponds to a "positive" (e.g., a classification as a positive class) or a "negative" (e.g., a classification as a negative class)). As will be discussed in detail below, a constraint can, for example, constrain a value of a variable in an entry of a dataset used to train the set of models.

In some cases, the output can specify what is being tested for, such as an input in a medical classifier being classified in the positive class as a tumor or the negative class as not a tumor. In some cases, the specified constraint can limit the number of "positive" classifications output by a model, the number of "negative" classifications output by a model, and/or the like. For example, if the variable includes capacity and the constraint specifies a condition on capacity, such as a maximum possible capacity, the aggregate number of "positive" classes provided by each model can be below the capacity constraint. For example, in a hospital admissions classifier (e.g., model and/or the like), the constraint can include the number of beds available to patients in the hospital, where a single patient can occupy a bed. The variable can include the number of currently admitted patients and a new patient can be classified in the positive class, to be admitted, or in the negative class, not to be admitted. But based on the constraint on the variable, the number of admitted patients cannot exceed the number of hospital beds. If, for example, the number of patients equals the number of hospital beds, currently admitted lower risk patients can be released early to free up beds for new patients with a risk greater than the lower risk patients.

In order to assess performance of the set of models, each class provided by a classifier can include an indication of whether the classification was a true classification (e.g., a true positive TP, a true negative TN, and/or the like) or a false classification (e.g., a false positive FP, a false negative FN, and/or the like). Each classification (e.g., true classification, false classification, and/or the like) can be associated with a value. For example, a "true positive" can be associated with a value $TP_v$, a "true negative" can be associated with a value $TN_v$, a "false positive" can be associated with a value $FP_v$, and a "false negative" can be associated with a value $FN_v$. When given a set of inputs, the set of models can provide a classification for each input. For example, given a set of inputs $\{x^{(1)}, \ldots, x^n\}$ and an ensemble model (e.g., a set of constrained models and/or the like) $M=\{M_1, \ldots, M_k\}$, each constrained model $M_i$ can provide a set of predictions $Y_i=\{y_i^{(1)}, \ldots, y_i^{(m)}\}$ such that the set of constrained models M provides a set of sets of predictions, $M(\{x^{(1)}, \ldots, x^{(m)}\})=\{M_1(\{x^{(1)}, \ldots, x^{(m)}\}), \ldots, M_k(\{x^{(1)}, \ldots, x^{(m)}\})\}=\{Y_1, \ldots, Y_k\}=\{\{y_1^{(1)}, \ldots, y_1^{(m)}\}, \ldots, \{y_k^{(1)}, \ldots, y_k^{(m)}\}\}$. For example, as discussed above, each prediction $y_i^{(j)}$ can include an indication whether the input $x^{(j)}$ was correctly classified by model $M_i$ (e.g., a "true") or incorrectly classified by model $M_i$ (e.g., a "false"). The predictions can be aggregated over $i \in \{1, \ldots, k\}$ and $j \in \{1, \ldots, n\}$. The aggregated predictions can include, for example, a count of "true positives" $TP_c$, a count of "true negatives" $TN_c$, a count of "false positives" $FP_c$, and a count of "false negatives" $FN_c$. For example, a constraint can provide a condition on one or more of $TP_c$, $TN_c$, $FP_c$, $FN_c$, and/or the like.

In some cases, the frequency with which a model was correct when predicting the "positive" class, or precision $$\left(e.g., \text{Precision} = \frac{TP_c}{TP_c + FP_c}\right),$$

can be used to assess the performance of the model. In some cases, the number of "positive" labels correctly identified by the model, or recall $$\left(e.g., \text{Recall} = \frac{TP_c}{TP_c + FN_c}\right),$$

can be used to assess the performance of the model. In some cases, the fraction of predictions that the model correctly predicted, or accuracy $$\left(e.g., \text{Accuracy} = \frac{TP_c + TN_c}{TP_c + TN_c + FP_c + FN_c}\right),$$

can be used to assess the performance of the model. But, assessing the performance of a model by optimizing on these metrics may not necessarily provide the best model for a given set of constraints. For example, in some cases, it can be desirable to assess the performance of the models by determining functions such as impact (e.g., Impact=$TP_c \cdot TP_v + TN_c \cdot TN_v + FP_c \cdot FP_v + FP_c \cdot FP_v$). In some cases, impact can include the aggregation over classifications of the count of classifications weighted by the value of respective classifications. In some cases, custom training and evaluation functions or metrics other than precision, recall, accuracy, loss, and/or impact can be used, including, for example, custom optimization functions. In some cases, a set of custom optimization functions can be used to generate the set of models. In some cases, a set of custom optimization functions can be used to assess the performance of the set of models by evaluating, for a given input data entry and/or set of constraints specifying a condition on a variable of the input data entry, respective outputs provided by the sets of models.

Further to the boolean case described above (e.g., model $M_i$ outputting either "positive" or "negative" for a given input), some implementations of the current subject matter can include multivariate models $M_i$, such that the output of the model includes three or more possible output values. For example, given a model $M_i$, an input $x^{(j)}$, where $x^{(j)}$ can include an element of the dataset $D_n$, and an output dimension $d_o$, where $d_o \geq 3$, the model can output $M_i(x^{(j)})=y_i^{(j)}$, where $y_i^{(j)} \in \{class_1, \ldots, class_{d_o}\}$. For example, if $d_o=3$, then the output $y_i^{(j)}$ can include either $class_1$, $class_2$, or $class_3$. Then, the performance of each model $M_i \in M$ can be provided in a confusion matrix characterizing, for each possible output, a value of a respective output given a respective actual value. For example, when the output of model $M_i$ on input $x^{(j)}$ is $y_i^{(j)}$ (e.g., $M_i(x^{(j)})=y_i^{(j)}$), the output can be compared with the actual value being predicted and the value $v_{st} \in R$ (e.g., $v_{st}$ can include a real number and/or the like) can be provided, where s can include the predicted class and t can include the actual (e.g., true and/or the like) value.

As illustrated in the confusion matrix below, the output $y_i^{(j)}$ of model $M_i$ on input $x^{(j)}$ can include $class_1$, $class_2$, or $class_3$. The actual value can include $class_1$, $class_2$, or $class_3$. When the output $y_i^{(j)}$ of model $M_i$ on input $x^{(j)}$ is $class_1$, the confusion matrix can include three different values characterizing the performance of the model. For example, when the output $y_i^{(j)}=class_1$ and the actual value is $class_1$ a value of $v_{11}$ can be obtained; when the output $y_i^{(j)}=class_1$ and the actual value is $class_2$ a value of $v_{12}$ can be obtained; and when the output $y_i^{(j)}=class_1$ and the actual value is $class_3$ a value of $v_{13}$ can be obtained.

confusion matrix actual $class_1$ $class_2$ $class_3$ $class_1$
$v_{11}$ $v_{12}$ $v_{13}$ $y_i^{(j)}$ $class_2$ $v_{21}$ $v_{22}$ $v_{23}$ $class_3$ $v_{31}$ $v_{32}$ $v_{33}$ To illustrate this example further, suppose the three classes are "red", "yellow", and "green", corresponding to a stoplight, and the problem includes predicting the color of the light by a self-driving car. Then $class_1$ can correspond to "red", $class_2$ can correspond to "yellow", and $class_3$ can correspond to "green". When a given model $M_i$ predicts the color of the stoplight as "red", the possible actual values can include "red", "yellow", and "green", and the confusion matrix can include a characterization of the performance of the model. For example, if the actual value is "red", then $v_{red,red}$ can be characterized as performing well. When the actual value is "yellow", then $v_{red,yellow}$ can be less than $v_{red,red}$, but not as low as $v_{red,green}$ when the actual value is "green", since a car stopping at a yellow light can be expected under ordinary driving conditions (e.g., the car being driven by a human), but a car stopping at a green light can be out of the ordinary. Similarly, a value characterizing the performance of the prediction can be provided for each pair of outputted class and respective actual value.

In some implementations, a feasible performance region can be determined using the assessment of the performance of the set of models. For example, as described above, the performance of each model can be assessed. The assessment of performance can be used to determine which model $M_i$ can be used for different values of the constrained variable $x_h^{(j)}$, $x^{(j)}=(x_1^{(j)}, \ldots, x_h^{(j)}, x_d^{(j)})$. For example, model $M_1$ may provide optimal performance for a value of the constrained variable $x_h^{(j)}$ less than a first threshold $T_1$, model $M_2$ may provide optimal performance for a value of the constrained variable $x_h^{(j)}$ greater than the first threshold $T_1$ but less than a second threshold $T_2$, and model $M_3$ may provide optimal performance for a value of the constrained variable $x_h^{(j)}$ greater than the second threshold $T_2$. In some cases, the feasible performance region can be determined by interpolating between the accuracy of the generated models to define a region, border, and/or the like. For example, a metric (e.g., accuracy, recall, precision, impact, and/or the like) can be determined for each model in the generated set of models. The respective metrics can be discrete elements (e.g., points and/or the like) of the constraint space (e.g., the number line representing the constraint and/or the like). The respective discrete elements can be used to interpolate, for example, a continuous boundary and/or region. In some cases, the feasible performance region can be determined by bounding the optimal points in a range of possible constraint values for respective (e.g., every) model in the set of models.

The feasible performance region of the set of models as a function of the resourcing level can be displayed. As will be discussed below, the displayed feasible performance region can include a visualization of, for example, the model $M_i$ that provides optimal performance in a given interval of the resourcing variable, the value of the custom training and evaluation function or metric that is optimized by the model $M_i$, and/or the like.

Figure 5:
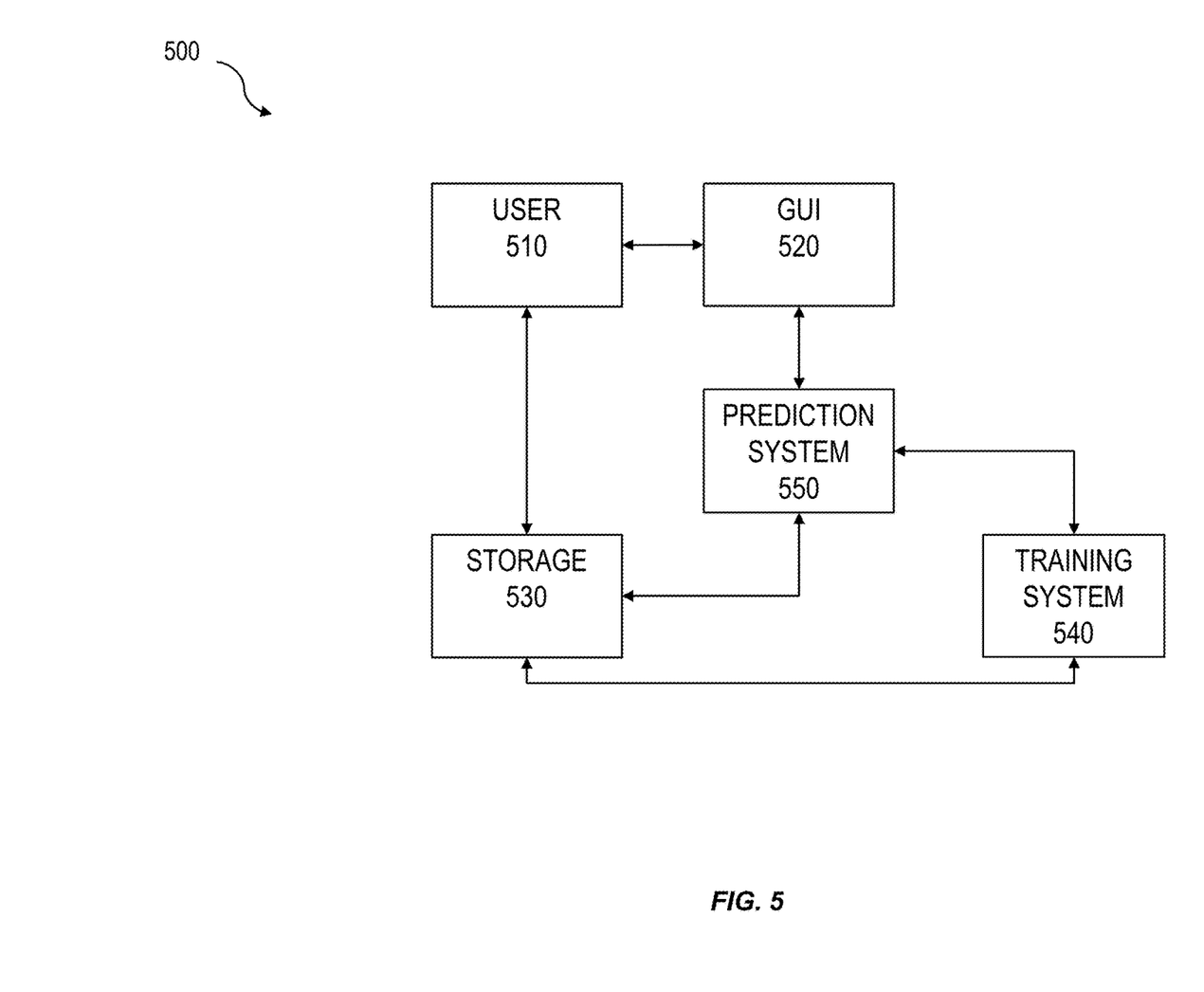
FIG. 5 is a system block diagram illustrating an example implementation of a system for training, assessing, and deploying a set of resourcing models.

FIG. 5 is a system block diagram illustrating an example implementation of a system 500 for training, assessing, and deploying a set of resourcing models. System 500 can include graphical user interface (GUI) 520, storage 530, training system 540, and prediction system 550. By training and assessing multiple models under different resourcing levels and providing an intuitive representation of the performance of the models under the different resource constraints, the model most appropriate for a given operational constraint can be selected and deployed. As such, the performance of the models can be improved and computational resources, production time, and production costs can be saved.

GUI 520 can be configured to receive input from user 510. For example, the input can include a dataset $D_n=\{x^{(1)}, \ldots, x^{(n)}\}$ for training the set of models $M=\{M_1, \ldots, M_k\}$, where k is the number of models in the set of models. As another example, the input can include values $TP_v$, $TN_v$, $FP_v$, $FN_v$; counts $TP_c$, $TN_c$, $FP_c$, $FN_c$; and/or the like. As another example, the input can include constraints (e.g., a condition on a variable and/or the like) $c_{h,r}^{(j)}$ on variables $x_h^{(j)}$ (e.g., columns and/or the like) of elements $x^{(j)}$ (e.g., rows and/or the like) of the dataset $D_n$, where, for example, $x_h^{(j)} \in x^{(j)}=(x_1^{(j)}, \ldots, x_h^{(j)}, \ldots, x_d^{(j)})$, $x^{(j)} \in D_n$, where n is the number of entries (e.g., rows and/or the like) in the dataset, d is the dimension (e.g., number of columns and/or the like) of each dataset entry, j is an index indicating a value in the range $\{1, \ldots, n\}$ (e.g., an index pointing to a dataset entry and/or the like), h is an index indicating a value in the range $\{1, \ldots, d\}$ (e.g., an index pointing to a variable of a dataset entry and/or the like), and r is an index indicating a value in the range $\{1, \ldots, \text{number of constraints on the variable } x_h^{(j)}\}$ (e.g., an index pointing to a constraint in the set of constraints on a variable and/or the like).

As another example, GUI 520 can be configured to receive user input specifying a training goal. For example, a training goal can include an indication of the output, performance, and/or the like of the set of models. For example, a set of models can be trained to optimize a first goal, such as optimizing impact (e.g., profit, revenue, and the like); optimize a first goal given a second goal, such as optimizing growth given break even profit, optimize cash flow given minimum investment, and/or the like. In some implementations, the boundary of feasible performance can determine all possible optimal points for $M=\{M_1, \ldots, M_k\}$.

Storage 530 can be configured to store (e.g., persist and/or the like), for example, inputs received from GUI 520 such as datasets $D_n=\{x^{(1)}, \ldots, x^{(n)}\}$; values $TP_v$, $TN_v$, $FP_v$, $FN_v$; counts $TP_c$, $TN_c$, $FP_c$, $FN_c$; constraints $c_{h,r}^{(j)}$ on variables $x_h^{(j)}$; and/or the like. As will be discussed below, storage 530 can be configured to store sets of trained models. And storage 530 can be configured to store, for example, the performance of the sets of models, assessments of the performance of the sets of models, and/or the like. Storage 530 can include, for example, repositories of data collected from one or more data sources, such as relational databases, non-relational databases, data warehouses, cloud databases, distributed databases, document stores, graph databases, operational databases, and/or the like.

Training system 540 can be configured to train sets of models $M=\{M_1, \ldots, M_k\}$ on datasets, such as $D_n=\{x^{(1)}, \ldots, x^{(n)}\}$. Each model $M_i \in M$ can be trained on the entries $x^{(j)}$ in the dataset $D_n$ using, for example, learning algorithms, such as principal component analysis, singular value decomposition, least squares and polynomial fitting, k-means clustering, logistic regression, support vector machines, neural networks, conditional random fields, decision trees, and/or the like. In some cases, the sets of models can be trained on constrained variables $x_h^{(j)} \in x^{(j)}$, where $x^{(j)} \in D_n$ and the constraint includes $c_{h,r}^{(j)}$. In some cases, user input can be received specifying a new constraint value $c_{h,r+1}^{(j)}$ and a new model $M_{k+1}$ can be generated. For example, the new model $M_{k+1}$ can be trained on the new constraint $c_{h,r+1}^{(j)}$.

Prediction system 550 can be configured to assess the performance of sets of models, such as $M=\{M_1, \ldots, M_k\}$, and determine feasible performance regions. As will be discussed below with reference to FIG. 6 and FIG. 7, the feasible performance region can include a set of intervals $I=\{(a_1, a_2), \ldots, (a_{p-1}, a_p)\}$, where for a given interval $(a_i, a_{i+1}) \in I$, $a_i \in \{a_1, \ldots, a_{p-1}\}$ can include the start values of the intervals and $a_{i+1} \in \{a_2, \ldots, a_p\}$ can include the end values of the intervals, such that for each interval $(a_i, a_{i+1}) \in I$, a model $M_{(a_i, a_{i+1})} \in M$ can provide optimal performance in the given interval $(a_i, a_{i+1})$. The optimally performing model $M_{(a_i, a_{i+1})}$, for example, can be associated with and used for values of the variable within the interval (e.g., $x_j^{(j)} \in (a_i, a_{i+1})$ and/or the like).

Following the above example, for each data set entry $x^{(j)} \in D_n$ and for each value of a variable in each dataset entry (e.g., $x_h^{(j)} \in x^{(j)}$), such that $a_1 \leq x_h^{(j)} \leq a_p$, the performance of each model $M_i \in M$ can be assessed by determining the output of each model $M_i$ when given the variable $x_h^{(j)}$, (e.g., $M_l(x_h^{(j)})$ can be computed and/or the like). In some cases, the output of the model can include impact. After computing the output of each model $M_l \in M$ over the values of the variable $x_h^{(j)}$ in each interval $(a_i, a_{i+1}) \in I$, the feasible performance region can include the set of intervals $I=\{(a_1, a_2), \ldots, (a_{p-1}, a_p)\}$ and, for each interval $(a_i, a_{i+1})$, the associated model $M_{(a_i, a_{i+1})}=M_l$ such that $M_l$ can include the optimally performing model in the interval $(a_i, a_{i+1})$. For example, the feasible performance region can include a map of intervals $(a_i, a_{i+1})$ to models $M_{(a_i, a_{i+1})}$, such that Feasible Performance Region=$\{(a_1, a_2):M_{(a_i, a_2)}, \ldots, (a_{p-1}, a_p): M_{(a_{p-1}, a_p)}\}$.

Figure 6:
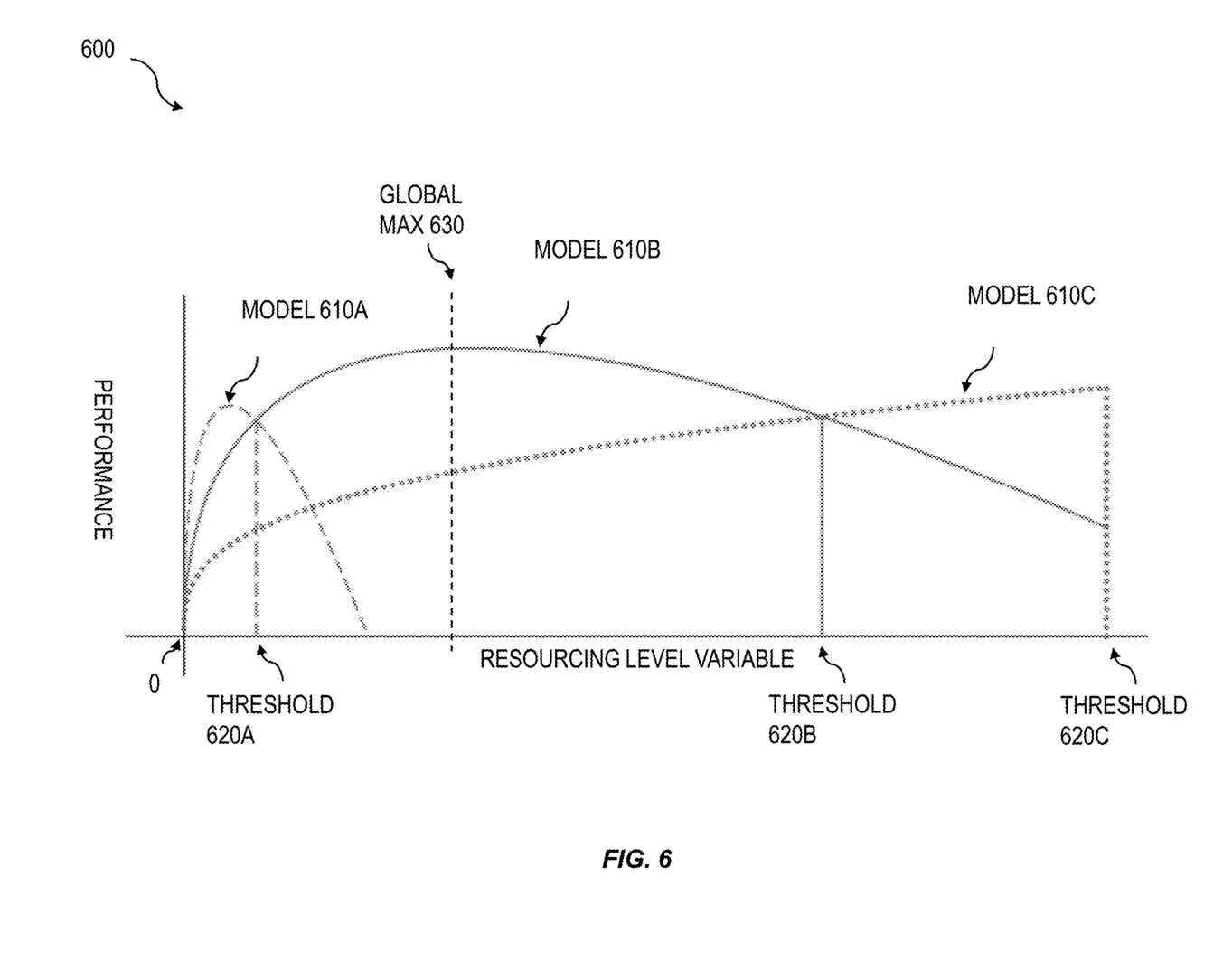
FIG. 6 is a diagram illustrating an example visualization of outputs provided by several models as a function of a resourcing variable.

FIG. 6 is a diagram illustrating an example visualization 600 of outputs provided by several models as a function of a resourcing variable. By training and assessing multiple models under different resourcing levels and providing an intuitive representation of the performance of the models under the different constraints, the model most appropriate for a given operational constraint can be selected and deployed. As such, the performance of the models can be improved and computational resources, production time, and production costs can be saved.

Figure 7:
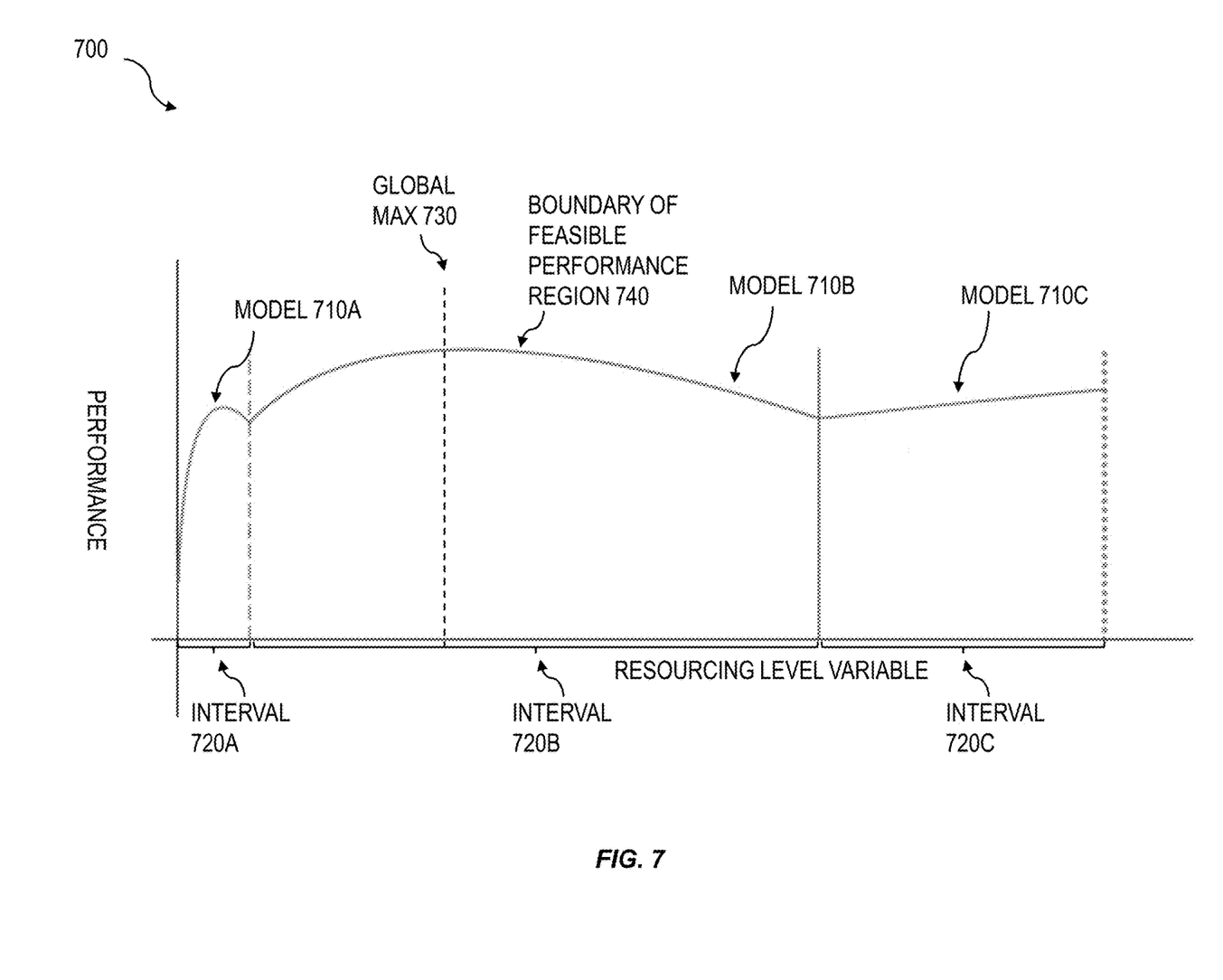
FIG. 7 is a diagram illustrating an example visual representation of a feasible performance region.

The visualization 600 can include, for example, a graph of performance as a function of the resourcing variable. In some cases, performance can include impact. The output of each model can be graphed. FIG. 6 illustrates the output of three models, model 610A, $M_A$, model 610B, $M_B$, and model 610C, $M_C$. As illustrated in FIG. 6, below threshold 620A the performance of model 610A is optimal, between threshold 620A and threshold 620B the performance of model 610B is optimal, and after threshold 620B the performance of model 610C is optimal. The intervals can be defined as $I=\{(a_1, a_2), (a_2, a_3), (a_3, a_4)\}$, where $a_1=0$, $a_2$=threshold 620A, $a_3$=threshold 620B, $a_4$=threshold 620C. Then, the feasible performance region can be Feasible Performance Region=$\{(a_1, a_2): M_A, (a_2, a_3): M_B, (a_3, a_4): M_C\}$ FIG. 7 is a diagram illustrating an example visual representation 700 of a feasible performance region. By training and assessing multiple models under different resourcing levels and providing an intuitive representation of the performance of the models under the different resourcing, the model most appropriate for a given operational constraint, business impact, or strategy can be selected and deployed. As such, the performance of the models can be improved and computational resources, production time, and production costs can be saved.

Visual representation 700 can include, for example, feasible performance region boundary 740. As described above with reference to FIG. 6, the feasible performance region can include, for example, interval 720A $(a_1, a_2)$ of resourcing associated with model 710A $M_A$, interval 720B $(a_2, a_3)$ of resourcing associated with model 720B $M_B$, and interval 720C $(a_3, a_4)$ of resourcing associated with model 710C $M_C$. Feasible performance region boundary 740 can easily represent the performance of a set of models, for example, over the entire domain of possible resource levels. To the user, feasible performance region boundary 740 can represent the performance of the set of models (e.g., $M=\{M_A, M_B, M_C\}$ and/or the like) and the set of models can be treated as a single model. As such, some implementations of the current subject matter can facilitate user interaction with a set of models $M=\{M_1, \ldots, M_k\}$ by treating the set of models as a single model $M^*$ (e.g., an ensemble model and/or the like). For example, with $M=\{M_A, M_B, M_C\}$, the interval $I=\{(a_1, a_2), (a_2, a_3), (a_3, a_4)\}$, and the feasible performance region $\{(a_1, a_2): M_A, (a_2, a_3): M_B, (a_3, a_4): M_C\}$, the single model $M^*$ can be defined piecewise such that, $$M^*(x_h^{(j)})=\{M_A(x_h^{(j)}), a_1 \leq x_h^{(j)} < a_2 M_B(x_h^{(j)}), a_2 \leq x_h^{(j)} < a_3 M_C(x_h^{(j)}), \& a_3 \leq x_h^{(j)} \leq a_4$$

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
monitoring, by a predictive system, user activity related to compliance with a predictive model that classifies an event as belonging to a first class of at least two classes, wherein the predictive model classifies the event based on a capacity and/or a cost-benefit of the classification of the event, the monitoring including receiving, for each of a plurality of events classified by the predictive model, data indicating whether a user took action associated with the first class, a capacity of the user, and a cost-benefit associated with the first class, and wherein the predictive model forms part of a set of models trained according to respective capacity levels;
determining, by the predictive system, based on the received data, an updated capacity and/or an updated cost-benefit;
providing, by the predictive system, the updated capacity and/or the updated cost-benefit;
updating, by the predictive system, the predictive model based on the determined updated capacity and/or the determined updated cost-benefit, wherein the updated predictive model classifies new events based on the updated capacity and/or the updated cost-benefit; and, in response to determining the updated capacity and/or updated cost-benefit, automatically causing the predictive system to select a new model from a set of models or keeping the current model, according to the updated capacity and/or updated cost-benefit.

2. The method of claim 1, wherein the monitoring includes receiving user input characterizing the capacity and/or the cost-benefit; and wherein the determining the updated capacity and/or the updated cost-benefit includes increasing or decreasing the capacity and/or the cost-benefit.

3. The method of claim 1, wherein the monitoring includes monitoring a field within a dataset for modification that indicates specific action by the user.

4. The method of claim 1, wherein the determining the updated capacity and/or updated cost-benefit includes determining that the user treats more events as belonging to the first class than the predictive model classifies into the first class.

5. The method of claim 4, wherein the updated capacity is determined to be greater than the capacity.

6. The method of claim 4, wherein the updated cost-benefit is determined to include a greater benefit of true positive and/or a lower cost of false positive.

7. The method of claim 1, wherein the determining the updated capacity and/or updated cost-benefit includes determining that the user treats fewer events as belonging to the first class than the predictive model classifies into the first class.

8. The method of claim 7, wherein the updated capacity is determined to be less than the capacity.

9. The method of claim 7, wherein the updated cost-benefit is determined to include a greater cost of false positive and/or a lower benefit of true positive.

10. The method of claim 1, further comprising:
determining that the user treats events classified into a second class by the predictive model as belonging to the first class;
determining a performance of the predictive model;
determining a performance of the user;
determining a new model in response to the performance of the user exceeding the performance of the model.

11. The method of claim 10, further comprising:
receiving data characterizing performance of a plurality of models associated with a plurality of users, each of the plurality of models associated with a respective user from the plurality of users;
receiving data characterizing, for each of the plurality of users, a respective compliance of the respective user;
determining a differential pattern of performance and compliance across the plurality of models and the plurality of users; and
determining, based on the differential pattern of performance and compliance, a desegregated model performance and a desegregated user compliance.

12. The method of claim 1, wherein the event includes a sales opportunity and the first class indicates that the sales opportunity should be pursued.

13. The method of claim 1, wherein the capacity characterizes a number of events the user processes within a given period of time.

14. The method of claim 1, wherein the cost-benefit characterizes an impact of treating the event as belonging to the first class, the impact characterized by a cost of a false positive, a cost of a false negative, a benefit of a true positive, and a benefit of a true negative.

15. A system comprising:
at least one data processor; and memory storing instructions which, when executed by the at least one data processor, causes the data processor to perform operations comprising:
monitoring user activity related to compliance with a predictive model that classifies an event as belonging to a first class of at least two classes, wherein the predictive model classifies the event based on a capacity and/or a cost-benefit of the classification of the event, the monitoring including receiving, for each of a plurality of events classified by the predictive model, data indicating whether a user took action associated with the first class, a capacity of the user, and a cost-benefit associated with the first class, and wherein the predictive model forms part of a set of models trained according to respective capacity levels;
determining, based on the received data, an updated capacity and/or an updated cost-benefit; providing the updated capacity and/or the updated cost-benefit;
updating the predictive model based on the determined updated capacity and/or the determined updated cost-benefit, wherein the updated predictive model classifies new events based on the updated capacity and/or the updated cost-benefit;
and, in response to determining the updated capacity and/or updated cost-benefit, automatically causing the system to select a new model from a set of models or keeping the current model, according to the updated capacity and/or updated cost-benefit.

16. The system of claim 15, wherein the monitoring includes receiving user input characterizing the capacity and/or the cost-benefit; and wherein the determining the updated capacity and/or the updated cost-benefit includes increasing or decreasing the capacity and/or the cost-benefit.

17. The system of claim 15, wherein the monitoring includes monitoring a field within a dataset for modification that indicates specific action by the user.

18. The system of claim 15, wherein the determining the updated capacity and/or updated cost-benefit includes determining that the user treats more events as belonging to the first class than the predictive model classifies into the first class.

19. The system of claim 18, wherein the updated capacity is determined to be greater than the capacity.

20. The system of claim 18, wherein the updated cost-benefit is determined to include a greater benefit of true positive and/or a lower cost of false positive.

21. The system of claim 15, wherein the determining the updated capacity and/or updated cost-benefit includes determining that the user treats fewer events as belonging to the first class than the predictive model classifies into the first class.

22. The system of claim 21, wherein the updated capacity is determined to be less than the capacity.

23. The system of claim 21, wherein the updated cost-benefit is determined to include a greater cost of false positive and/or a lower benefit of true positive.

24. The system of claim 15, the operations further comprising:
determining that the user treats events classified into a second class by the predictive model as belonging to the first class;
determining a performance of the predictive model;
determining a performance of the user;
determining a new model in response to the performance of the user exceeding the performance of the model.

25. The system of claim 24, the operations further comprising:
receiving data characterizing performance of a plurality of models associated with a plurality of users, each of the plurality of models associated with a respective user from the plurality of users;
receiving data characterizing, for each of the plurality of users, a respective compliance of the respective user;
determining a differential pattern of performance and compliance across the plurality of models and the plurality of users; and
determining, based on the differential pattern of performance and compliance, a desegregated model performance and a desegregated user compliance.

26. The system of claim 15, wherein the cost-benefit characterizes an impact of treating the event as belonging to the first class, the impact characterized by a cost of a false positive, a cost of a false negative, a benefit of a true positive, and a benefit of a true negative.

27. The method of claim 1, further comprising:
applying the updated predictive model to a new event, wherein the updated predictive model includes at least one of the updated capacity and the updated cost-benefit.

28. The system of claim 15, wherein the data processor further includes instructions to perform operations comprising:
applying the updated predictive model to a new event, wherein the updated predictive model includes at least one of the updated capacity and the updated cost-benefit.

* * * * *